(12) United States Patent
Manessis et al.

(10) Patent No.: US 8,359,630 B2
(45) Date of Patent: Jan. 22, 2013

(54) METHOD AND SYSTEM FOR IMPLEMENTING A DYNAMIC VERIFICATION VALUE

(75) Inventors: Thomas Manessis, Pacifica, CA (US); Gary Gerber, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 724 days.

(21) Appl. No.: 12/194,402

(22) Filed: Aug. 19, 2008

(65) Prior Publication Data

US 2009/0055893 A1 Feb. 26, 2009

Related U.S. Application Data

(60) Provisional application No. 60/956,749, filed on Aug. 20, 2007.

(51) Int. Cl.
*H04L 29/06* (2006.01)
(52) U.S. Cl. ............................................. 726/2; 726/9
(58) Field of Classification Search .................. 726/2, 9; 705/35, 39, 75
See application file for complete search history.

(56) References Cited

U.S. PATENT DOCUMENTS

| | | |
|---|---|---|
| 5,450,491 A | 9/1995 | McNair |
| 5,477,038 A | 12/1995 | Levine et al. |
| 5,500,513 A | 3/1996 | Langhans et al. |
| 5,621,201 A | 4/1997 | Langhans et al. |
| 5,883,810 A | 3/1999 | Franklin et al. |
| RE36,365 E | 11/1999 | Levine et al. |
| 6,000,832 A | 12/1999 | Franklin et al. |
| RE37,122 E | 4/2001 | Levine et al. |
| 6,227,447 B1 | 5/2001 | Campisano |
| 6,263,446 B1 | 7/2001 | Kausik et al. |
| 6,341,724 B2 | 1/2002 | Campisano |
| RE38,255 E | 9/2003 | Levine et al. |
| 6,980,970 B2 | 12/2005 | Krueger et al. |
| 7,051,929 B2 | 5/2006 | Li |
| 7,099,850 B1 | 8/2006 | Mann, II et al. |
| 7,103,576 B2 | 9/2006 | Mann, II et al. |
| 7,177,848 B2 | 2/2007 | Hogan et al. |
| 7,227,950 B2 | 6/2007 | Faith et al. |
| 7,343,351 B1 | 3/2008 | Bishop et al. |
| 7,347,361 B2 | 3/2008 | Lovett |
| 7,412,420 B2 | 8/2008 | Holdsworth |
| 7,437,575 B2 | 10/2008 | Dennis et al. |
| 7,747,539 B2* | 6/2010 | Desany et al. .................. 705/67 |
| 2002/0111919 A1 | 8/2002 | Weller et al. |
| 2002/0194138 A1 | 12/2002 | Dominguez et al. |
| 2002/0194503 A1 | 12/2002 | Faith et al. |
| 2003/0200184 A1 | 10/2003 | Dominguez et al. |
| 2003/0212642 A1 | 11/2003 | Weller et al. |
| 2003/0233292 A1 | 12/2003 | Richey et al. |
| 2005/0029344 A1 | 2/2005 | Davis |
| 2005/0043997 A1* | 2/2005 | Sahota et al. .................. 705/16 |
| 2005/0102234 A1 | 5/2005 | Devine |
| 2005/0246278 A1 | 11/2005 | Gerber et al. |
| 2006/0006224 A1 | 1/2006 | Modi |
| 2006/0179007 A1 | 8/2006 | Davis |

(Continued)

*Primary Examiner* — Ali Abyaneh
(74) *Attorney, Agent, or Firm* — Kilpatrick Townsend & Stockton LLP

(57) ABSTRACT

A method is disclosed, which includes receiving a message including an account identifier and a first verification value. The method uses the account identifier to select a dynamic verification value process from at least two dynamic verification value processes. Then, using the selected dynamic verification value process, a second verification value is determined. Next, the method determines if the first verification value and the second verification value match or are within an expected range.

20 Claims, 9 Drawing Sheets

U.S. PATENT DOCUMENTS

| | | |
|---|---|---|
| 2007/0055597 A1 | 3/2007 | Patel |
| 2007/0100691 A1 | 5/2007 | Patterson |
| 2007/0118483 A1 | 5/2007 | Hill et al. |
| 2007/0136211 A1 | 6/2007 | Brown et al. |
| 2007/0143605 A1 | 6/2007 | Metke et al. |
| 2007/0208671 A1 | 9/2007 | Brown et al. |
| 2008/0029593 A1 | 2/2008 | Hammad et al. |
| 2008/0071680 A1 | 3/2008 | Sheets |
| 2008/0103968 A1* | 5/2008 | Bies et al. ............ 705/39 |
| 2008/0167991 A1 | 7/2008 | Carlson et al. |
| 2008/0203151 A1 | 8/2008 | Dixon |
| 2008/0203152 A1 | 8/2008 | Hammad et al. |
| 2008/0203170 A1 | 8/2008 | Hammad et al. |
| 2008/0301461 A1* | 12/2008 | Coulier et al. ............ 713/184 |
| 2009/0030845 A1 | 1/2009 | Hurry et al. |
| 2009/0077104 A1 | 3/2009 | Sheets |
| 2009/0319430 A1 | 12/2009 | Faith et al. |

* cited by examiner

METHOD AND SYSTEM FOR IMPLEMENTING A DYNAMIC VERIFICATION VALUE

CROSS-REFERENCES TO RELATED APPLICATIONS

This patent application claims priority to U.S. Provisional Application No. 60/956,749 filed Aug. 20, 2007, entitled "Method And System For Implementing A Dynamic Verification Value," which is hereby incorporated by reference in its entirety for all purposes. This application is also related to U.S. patent application Ser. No. 12/032,495, filed on Feb. 15, 2008, Ser. No. 11/764,622, filed on Jun. 18, 2007, and Ser. No. 10/642,878, filed on Aug. 18, 2003, which are herein incorporated by reference in their entirety for all purposes.

BACKGROUND

Embodiments of the invention relate in general to payment transactions, and can apply to card present (CP) and card not present (CNP) transactions involving payment devices such as credit, debit or prepaid cards, as well as non-card forms, associated with an account identifier.

In order to protect financial institutions, consumers, and merchants from fraud, the financial services industry has developed and introduced many static features designed to reduce fraud and counterfeiting such as holograms, special over-layers, and watermarks. Nonetheless, many of these features are proving to be less effective as financial transactions are increasingly being conducted in a CNP, remote (e.g., a kiosk) or wireless environment. Similarly, as financial instruments are increasingly being employed on electronic devices, rather than physical plastic cards, the ability to use techniques such as a consumer signature or holograms to authenticate a payment device is becoming less available.

Therefore, one of the primary means to protect against fraud is to include data in the financial transaction that dynamically changes from transaction to transaction or on a periodic basis. Dynamically changing data makes compromised data essentially worthless for subsequent transactions because such transactions will require alternate data. Dynamically changing data serves as a verification value for transaction data because if the verification value does not meet an expected verification value, the transaction will not be processed.

However, applying dynamic changing verification values to the financial transaction record requires different processes and algorithms depending on the payment channel, device, or method used. For example, dynamic verification values may be implemented differently on a credit card than on a payment application residing on a cell phone.

Therefore, what is needed is a system and method for authenticating a payment device that accommodates a plurality of processes for generating dynamic verification values. There is a further need for a system and method for authenticating a payment device in a manner that does not require significant updates or changes to the existing payment infrastructure.

Embodiments of the invention address the above problems, and other problems, individually and collectively.

SUMMARY

Embodiments of the invention are directed to methods, systems, and computer readable media that can be used to authenticate a payment device associated with a dynamic verification value, wherein embodiments of the invention accommodate a plurality of methods used for determining a dynamic verification value. Advantageously, in embodiments of the invention, the payment device is authenticated in a manner that does not require significant updates or changes to the existing payment infrastructure.

One embodiment of the invention provides a method that can be performed by a server computer in a payment processing network, or the like. The method comprises receiving a message including an account identifier and a first verification value. The method uses the account identifier to select a dynamic verification value process from at least two dynamic verification value processes. Then, using the selected dynamic verification value process, a second verification value is determined. Next, the method determines if the first verification value and the second verification value match or are within an expected range. This method may be performed by a suitable entity such as a payment processing network at a service provider.

Another embodiment of the invention is directed to a computer readable medium comprising code for performing the method described above. The computer readable medium comprises code for authenticating a payment device. The computer readable medium further comprises code for receiving a message including an account identifier and a first verification value. The computer readable medium further comprises code for selecting a dynamic verification value process from at least two dynamic verification value processes and determining a second verification value using the selected dynamic verification value process. The computer readable medium further comprises code for determining if the payment device is authentic using the first verification value and the second verification value. An embodiment includes a server computer at a payment processing network comprising a processor and the computer readable medium coupled to the processor. A system may comprise the server computer.

Another embodiment of the invention is directed to a method for sending a transaction message. The method comprises generating a message including an account identifier and a first verification value. The method further comprises sending the message to a server computer, wherein the server computer is configured to select a dynamic verification value process from at least two dynamic verification value processes using the account identifier. The server computer is further configured to determine a second verification value using the selected dynamic verification value process. The server computer is further configured to determine if the first verification value and the second verification value match or are within an expected range. A payment device or an access device at a merchant location may generate the message.

Another embodiment of the invention is directed to computer readable medium. The computer readable medium comprises code for generating a message including an account identifier and a first verification value. The computer readable medium further comprises code for sending the message to a server computer, wherein the server computer is configured to select a dynamic verification value process from at least two dynamic verification value processes using the account identifier. The server computer is further configured to determine a second verification value using the selected dynamic verification value process. The server computer is further configured to determine if the payment device is authentic using the first verification value and the second verification value. A payment device such as a smartcard may comprise this computer readable medium.

These and other embodiments of the invention are described in further detail below, with reference to the Figures.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Figure 1:
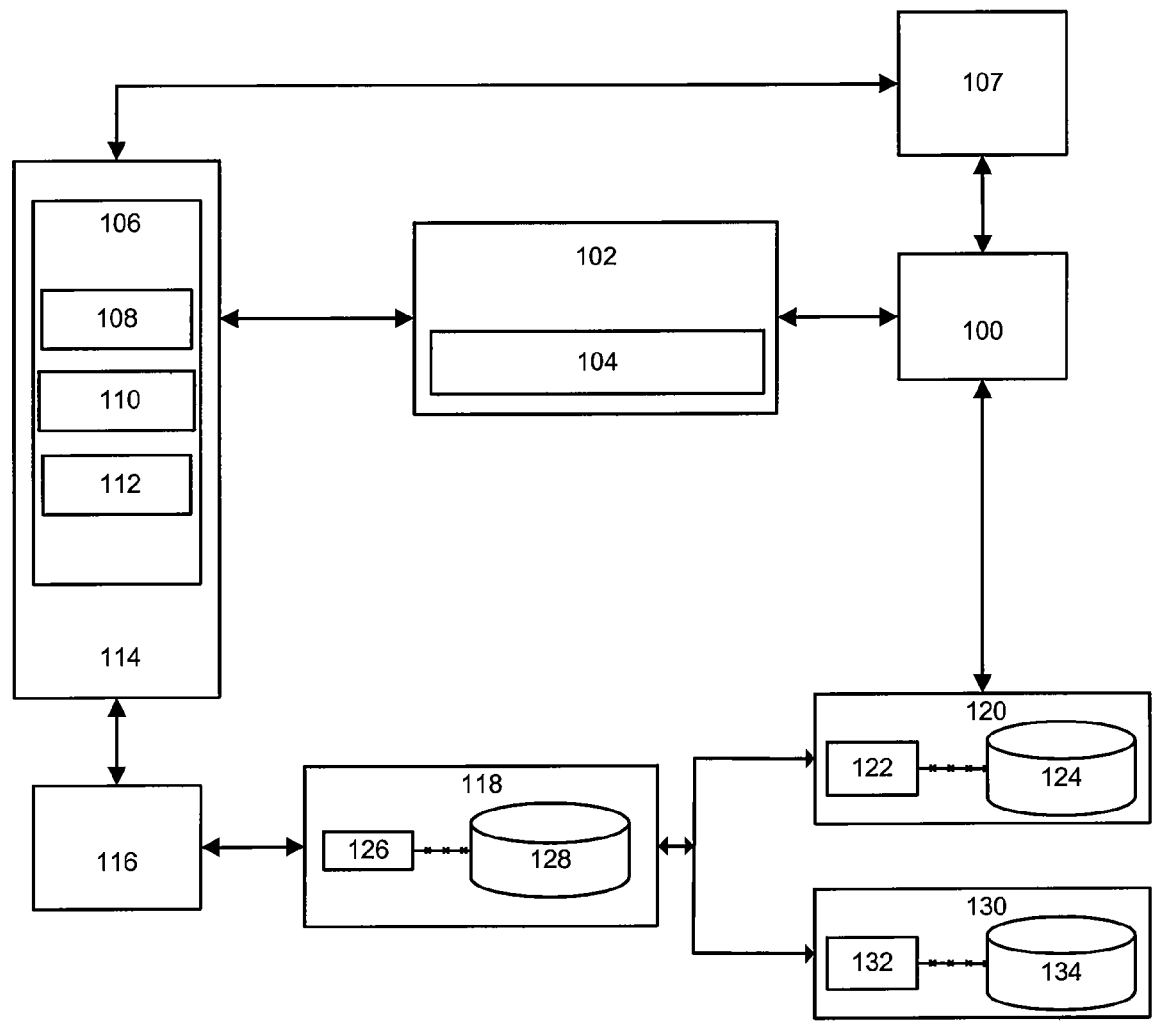
FIG. 1 shows a block diagram illustrating a transaction processing system according to an embodiment of the invention.

For purposes of this application, the term "payment device" can mean any device, which may be used in a transaction as described herein. Without limiting the generality of the foregoing, "payment device" can include any suitable device that can be associated with a transaction. A payment device may include a portable device such as a magnetic stripe card, an integrated circuit card (also commonly known as a smartcard), a memory card, a mobile phone, a key fob, etc. Payment devices may also include devices that are not necessarily capable of being used in a card present type of situation. For example, a payment device can alternatively be a device that only generates a dynamic verification value and is not intended to be carried by a person. Other examples of payment devices are provided below.

As described above, financial institutions need to protect consumers and merchants from fraudulent transactions. Moreover, the protection scheme desirably accounts for all types of transactions. For example, any protection scheme can include both CP transactions and CNP transactions. An exemplary CP transaction is one in which a consumer presents a payment device such as a transaction card to an access device at the merchant's location. In contrast, an exemplary CNP transaction includes an e-commerce transaction in which a consumer makes a purchase over the Internet by providing a merchant with transaction information to process, but the consumer's transaction card is not physically presented to the merchant.

To protect consumers, financial institutions traditionally used a number of static authentication mechanisms. For example, to protect against fraud and counterfeiting in CP transactions, transaction cards may employ devices such as holograms, special over-layers, and watermarks to provide indications of authenticity that can be determined by a merchant accepting the card. To protect CNP transactions, financial institutions may employ a card verification value (CVV) such as a CVV2 value. A CVV2 value, for example, is a three-digit number printed on the back of a transaction card such as a credit card. The CVV2 value is typically used for online shopping where an on-line merchant wants to ensure that the current consumer possesses an authentic transaction card. In a typical on-line transaction, the consumer provides the CVV2 to the on-line merchant for added security, because the merchant cannot physically examine the transaction card.

It would be desirable to improve upon such conventional processes, because static devices, such as account identifiers and CVV numbers, can be duplicated and used in a fraudulent manner. Therefore, as described above, financial institutions have implemented a dynamic verification value process to protect against subsequent fraudulent use.

The proliferation of different types of payment devices such as payment cards, phones, key fobs, and the like provides a need to have different dynamic verification value processes. For instance, different payment devices may have different technical capabilities. For example, a payment device in the form of a smartcard may use a verification value process that includes using a counter. Another payment device such as a phone may have a payment application as well as a verification value process that includes using a time-based trigger. A process using a time-based trigger might be more appropriate for a phone than a card, since a phone already has an internal clock and existing payment cards may not have internal clocks. Other payment devices may use a dynamic verification value process that uses a list of pre-generated dynamic data. A pre-generated list of dynamic data may be more appropriate since some payment devices may not have counter- or time-based capabilities.

In some embodiments, different verification value processes can be used for different types of payment device form factors, different issuers, different time periods of issuance, and/or different environments, etc. Embodiments of the invention can determine which type of verification value process is appropriately used for each transaction that is conducted and can apply the appropriate verification value process. In another example, one type of verification value process can be used if the transaction is a CP type of transaction, and another type of verification value process can be used if the transaction is a CNP type of transaction.

The authentication process according to embodiments of the invention can be used to authenticate different payment devices using a plurality of different processes. In an embodiment, each authentication process may use a different type of algorithm to determine the dynamic data. As will be illustrated in further detail below, because embodiments of the invention accommodate different types of dynamic data, a payment processing network (or other entity or apparatus) according to an embodiment of the invention can support a variety of payment devices (e.g., mobile phones, key fobs, cards, etc.).

In an embodiment of the invention, the method comprises receiving a message including an account identifier and a first verification value. The account identifier may be any number of digits that identifies the account with the account holder. The first verification value comprises or may be derived from dynamic data, which may include, for example, a counter, a time, a date, or any other variable data element that changes. For example, the first verification value may comprise a dynamic card verification value (dCVV) such as a dCVV2 value, and this value may be derived from a counter value and consumer specific information such as a primary account number.

The method then comprises selecting a dynamic verification value process from at least two dynamic verification value processes using the account identifier. In another embodiment, the method comprises selecting the dynamic verification value process from at least three dynamic verification value processes. As will be appreciated, the method may select among any number of dynamic verification value processes. The method can use the account identifier to select the appropriate dynamic verification value process, since the account identifier is associated with the payment device and the dynamic verification value process used to generate the dynamic verification value.

When the payment device is initially issued to the consumer, the type of dynamic verification process associated with that payment device can be recorded with the payment processing network or other entity. The payment processing network can subsequently select the correct dynamic verification value process associated with the received account identifier when authenticating the consumer's payment device.

The method then comprises determining a second verification value using the selected dynamic verification value process. In order to authenticate the payment device, the first verification value is compared with the determined second verification value. The second verification value is determined in the selected manner based on the process associated with the account identifier. In one embodiment, the step of determining a second verification value may comprise deriving a verification value using an algorithm. In another embodiment, the step of determining a second verification value may comprise retrieving a stored verification value from memory or a database.

The method then comprises determining if the payment device is authentic using the first verification value and the second verification value. In one embodiment, the first and second verification values are compared, and the payment device may be authentic if the first and second verification values are within a predetermined range. If the values are not equal or within the predetermined range, then the payment device may not be authentic. If the payment device is not authentic, then a fraud alert may be triggered.

FIG. 1 shows a system that can be used in an embodiment of the invention. In FIG. 1, a consumer 100 uses a payment device 102 to complete a transaction at a merchant 114.

The consumer 100 may be an individual or an organization such as a business that is capable of purchasing goods and services. In FIG. 1, the consumer has an account with issuer A 120 to which the payment device 102 is associated.

A payment device 102, may comprise a radio-frequency contactless element 104. The radio-frequency contactless element 104 may include a computer chip (not shown) configured to store a transaction counter, an account identifier, which may comprise an account number, an expiration date, and encryption keys. Examples of payment devices include contact-based or contactless smartcards such as credit, debit or prepaid cards, wireless phones, PDAs (personal digital assistants), key fobs, software, etc. An exemplary a smartcard and an exemplary phone are described below with respect to FIGS. 7A and 7B.

The merchant 114 in FIG. 1 has an access device 106 located at the merchant 114, but the access device 106 may be located at any other suitable location in other embodiments of the invention. The access device 106 may include a reader 108 (a contact or a contactless reader), a processor 110, and a computer readable medium (CRM) 112. These components may be operatively coupled together. Examples of access devices include point of sale (POS) terminals, cellular phones, personal digital assistants (PDAs), personal computers, handheld specialized readers, set-top boxes, electronic cash registers, automated teller machines (ATMs), virtual cash registers, kiosks, security systems, access systems, and the like.

In a typical transaction, when the consumer 100 uses the payment device 102, account information is transferred to the payment processing network 118 via the merchant 114 and the acquirer 116. The acquirer 116 is typically a bank that has a merchant account, and the merchant 114 may be associated with the acquirer 116. In some embodiments, the account information may be transferred through other entities or directly to the payment processing network 118, and embodiments of the invention include such entities.

The payment processing network 118 may include data processing subsystems, networks, and operations used to support and deliver authentication services, exception file services, and clearing and settlement services. The payment processing network 118 may include a server computer 126 operatively coupled to a database 128 The database 128 may contain information such as the various verification value processes used by different issuers, account identifiers, etc.

A server computer 126 is typically a powerful computer or cluster of computers. For example, the server computer 126 can be a large mainframe, a minicomputer cluster, or a group of servers functioning as a unit. In one example, the server computer 126 may be a database server coupled to a Web server (not shown). The payment processing network 118 may use any suitable wired or wireless network, including the Internet. The server computer 126 may comprise a processor and a computer readable medium. The computer readable medium may comprise code (or instructions executable by the processor) for receiving a message including an account identifier and a first verification value, selecting a dynamic verification value process from at least two dynamic verification value processes using the account identifier, determining a second verification value using the selected dynamic verification value process, and determining if the payment device is authentic using the first verification value and the second verification value.

The payment processing network 118 may interface with multiple issuers such as issuer A 120 and issuer B 130. Therefore, the payment processing network 118 determines which issuer is associated with the account information. Although only two issuers are shown in FIG. 1, any number of issuers or other entities may be associated with the payment processing network 118. Issuer A 120 and Issuer B 130 may be banks, but could also be business entities such as retail stores. Some entities are both acquirers and issuers, and embodiments of the invention include such entities. Issuer A 120 may include a server computer 122 and a database 124, and Issuer B 130 may include a server computer 132 and a database 134.

A client computer 107 that is operated by the consumer 100 and is in operative communication with the merchant 114 and its associated Web site (not shown) is also shown. The client computer 107 can be used for card not present transactions. In other embodiments, client computer 107 can be a phone that is operated by the consumer 100 and that is in operative communication with the merchant 114 and its associated phone order system.

The access device 106, and/or the client computer 107 may include a processor and a computer readable medium. The computer readable medium may comprise code (or instructions executable by the processor) for generating a message including an account identifier and a first verification value and sending the message to the server computer 126. The server computer 126 is configured to select a dynamic verification value process from at least two dynamic verification value processes using the account identifier, determine a second verification value using the selected dynamic verification value process, and determine if the payment device is authentic using the first verification value and the second verification value.

Figure 2:
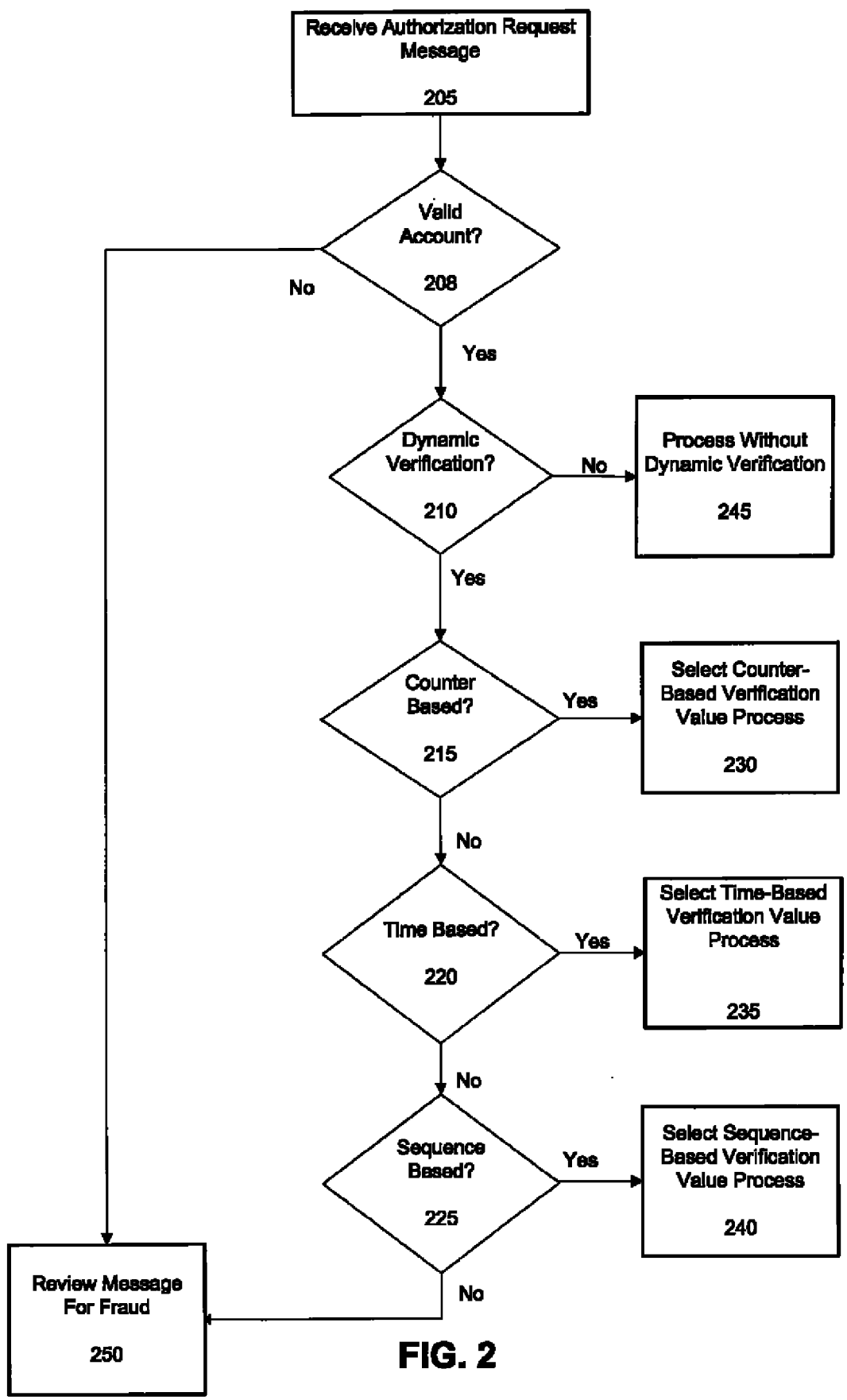
FIG. 2 shows a flow chart illustrating a method of authenticating a payment device according to an embodiment of the invention.

FIG. 2 shows a flow chart illustrating a method of authenticating a payment device according to an embodiment of the invention. At least some of the method steps illustrated in FIG. 2 can be performed by a server computer 126 in a payment processing network 118 or other type of network.

The method begins when an authorization request message comprising at least an account identifier and a first verification value (e.g., previously generated by a payment device) is received by the server computer 126 (step 205) from a merchant Website or from a merchant's access device. The message may comprise data as shown in FIG. 6.

Figure 6:
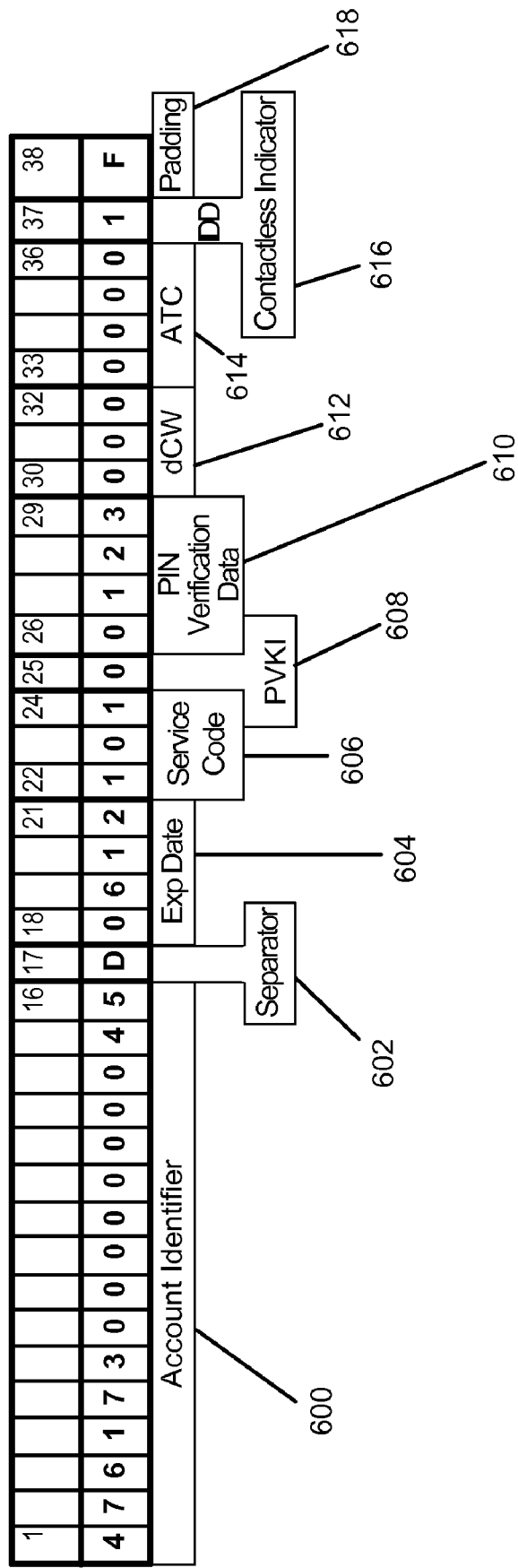
FIG. 6 shows a schematic illustration of an exemplary record format including transaction data in a data field.

FIG. 6 shows a schematic illustration of an exemplary record format for transporting the message. In FIG. 6, an account identifier 600 occupies the first 16 digits of the record. An account identifier 600 may comprise an account number, and the account identifier 600 may comprise more or less than 16 digits. Next, a separator 602 provides a buffer between the account identifier 600 and the expiration date 604. The service code 606 follows the expiration date 604. Then, a personal identification number (PIN) verification indicator (PVKI) 608 and the PIN verification data 610 follow. Finally, the dynamic card verification value (dCVV) field 612, the transaction counter 614, a contactless indicator 616, and padding 618 complete the data fields.

Referring back to FIG. 2, after the authorization request message is received by the server computer 126 (step 205), the server computer 126 determines if the account identifier is a valid (step 208). To determine if the account identifier is valid, the server computer 126 may compare the received account identifier with a list of valid account identifiers. Each valid account identifier is associated with a variety of attributes. Such attributes may comprise the issuer associated with the account, enrollment status of the account in a dynamic verification program, an authentication process, and an algorithm for determining a dynamic verification value.

If the account identifier is invalid, the server computer 126 reviews the received message for possible fraud (step 250). In an embodiment, if the account identifier is found invalid, a fraud alert may be issued. A fraud alert may alert the account holder, issuer, merchant, or other party to the possibility of fraudulent activity. A fraud alert can be sent to the consumer's telephone.

If the account identifier is valid, the authentication method continues. The server computer 126 next determines whether the account identifier is enrolled in a dynamic verification program (step 210).

If the account identifier is not enrolled in the dynamic verification program, then the message is processed without using a dynamic verification value process (step 245). The authorization request message, which contained the data including the account identifier, expiration date, purchase amount, and other information, can simply be forwarded to the issuer of the consumer's payment device for approval or denial.

If the account identifier is enrolled in the dynamic verification program, then the dynamic verification process associated with the account identifier is then determined and selected by the server computer 126. The server computer 126 can select from many different dynamic verification value processes with different algorithms.

In some embodiments of the invention, the different dynamic verification value processes may include a counter-based process, a time based process, and a sequence based process. Some or all of these processes may be used, and other verification value processes could also be used. Thus, if the account identifier is associated with a counter-based dynamic verification value process (step 215), then the payment device can be authenticated using a counter-based verification value process (step 230). If the account identifier is associated with a time-based verification value process (step 220), then the payment device is authenticated using a time-based process (step 235). If the account identifier is associated with a sequence-based verification value process (step 225), then the transaction is processed using a sequence-based process (step 240).

If the message is not associated with any recognized process of dynamic verification, then the server computer 126 can analyze the message for fraud (step 250). In addition to setting a fraud alert, as discussed above, additional steps may also be taken, which may include freezing the account to protect all parties involved from fraud. Other protective measures will be appreciated by one skilled in the art.

Figure 3A:
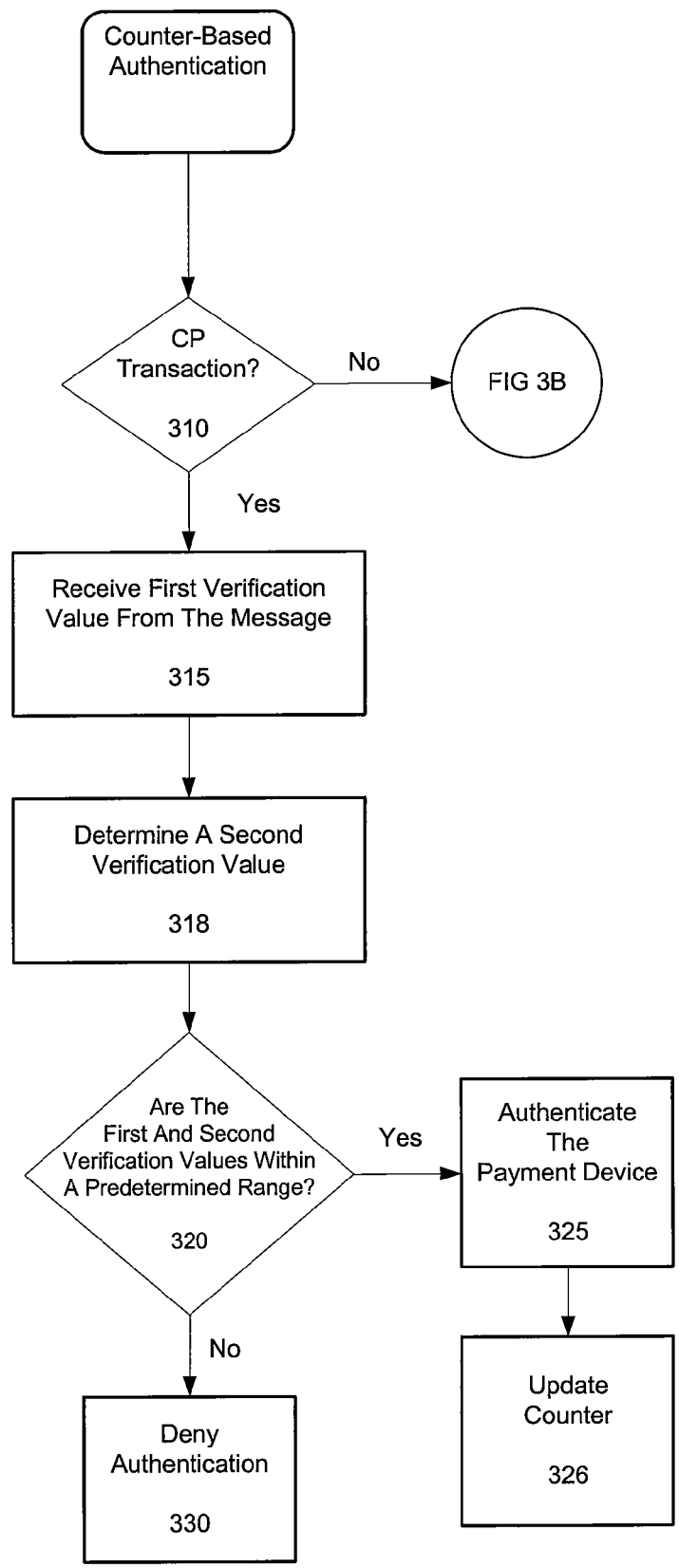
FIG. 3A shows a flow chart illustrating a process of authenticating a payment device in a card present transaction using a counter-based verification value according to an embodiment of the invention.

FIG. 3A shows a flow chart illustrating a process of authenticating a payment device in a card present transaction using a counter-based verification value according to an embodiment of the invention. The term "card present" or "CP" is intended to include any situation where the consumer 100 is physically located at the merchant 114. In some embodiments, the counter-based authentication process may vary depending on whether the transaction is a CP transaction or a CNP transaction. Therefore, upon selection by the server computer 126 of the counter-based verification value process (step 230), the type of transaction is then determined (step 310). If the transaction is a CP counter-based transaction, then the payment device is authenticated as described with reference to FIG. 3A. If the transaction is a CNP counter-based transaction, then the payment device is authenticated as described with reference to FIG. 3B.

The method of authenticating a CP transaction using a counter-based verification value can be described with reference to FIGS. 1, 2, and 3A.

In an exemplary counter-based CP transaction, the consumer 100 uses a payment device 102 at a merchant location 114. The payment device 102 interacts with, for example, the merchant's access device 106. In an embodiment, the payment device 102 is a card, and the access device 106 is a POS terminal. The card may comprise a smartcard, which is presented to the merchant's POS terminal to complete a transaction.

During the interaction, the payment device 102 transfers authentication information comprising an account identifier and a first verification value to the access device 106. The first verification value is generated, for example, after the interaction between the access device 106 and the payment device 102. The access device 106 triggers the payment device 102 to increment a counter stored on the payment device 102. The change in the counter value provides the dynamically variable data, which protects the transaction. After the access device 106 triggers the payment device 102, the payment device 102 transmits the authentication information, which includes the new counter value and account identifier to the access device 106.

Each time the payment device 102 is presented to an access device 106, the counter changes, which alters the authentication information. Therefore, if a fraudster recorded a previous transaction record, subsequent use of the transaction record would be useless because the counter value will have changed. The payment device 102 may comprise any type of device that provides the ability to change a counter, such as a chip card (e.g., a smart card), PDA, key fob, or phone.

After the authentication information is received, for example, by the access device 106, the authentication information is input into an authorization request message and communicated to the payment processing network 118 for authentication. The server computer 126 receives the message (step 205) and determines if the account identifier in the message is valid (step 208), as discussed above.

After the account identifier is determined to be valid, the server computer 126 determines, as explained above, if there is dynamic verification associated with the account identifier (step 210). In this example, the server computer 126 determines that there is dynamic verification and that it is counter-based, so the server computer 126 selects the counter-based verification value process (step 230).

Next, the server computer 126 determines, in this example, that the transaction is a CP transaction (step 310). The server computer 126 receives the first verification value from the authorization request message (step 315). The first verification value comprises the new counter value. Then, the server computer 126 determines a second verification value (step 318).

The second verification value comprises the expected value to which the first verification value is compared. In this example, the second verification value is the expected counter value. A variety of different methods may be used to determine the second verification value. In one embodiment, a stored counter value associated with the received account identifier is retrieved and updated, for example by incrementing the counter value, to provide the second verification value. In addition to incrementing the counter, the counter may be, for example, decremented or updated according to a formula, code, or pseudorandom sequence. In another embodiment, a pointer associated with an account identifier may indicate the current counter value, and the pointer value is updated to retrieve the updated counter value.

Next, the server computer 126 then compares the first verification value with the second verification value (step 320). In an embodiment, when the first and second verification values are compared, the payment device 102 is authentic if the first verification value and the second verification value match or are within a predetermined range.

A predetermined range of expected verification values accounts for potential problems. For example, the stored counter value on a payment device may become out of synchronization with the stored value on a payment processing network. This problem may occur, for example, if a payment device 102 accesses a merchant's access device 106 to engage in a transaction, which changes the counter on the payment device 102, but during the transaction, the access device 106 fails to receive or transmit the transaction message containing the counter. Because of this failure, the payment processing network 118 will not update its counter value to match the value on the payment device 102. Therefore, subsequently received messages will not contain a counter value that matches the payment processing network's 118 expected counter value. Consequently, a consumer 100 would be unable to complete any further transactions because the payment processing network 118 would not authenticate the payment device. However, by using a predetermined range, the process accounts for the possibility of such problems, and allows a consumer 100 to complete a transaction. Advantageously, this maintains consumer satisfaction, accommodates unforeseen problems, and reduces costs to the issuer because a new card does not need to be issued or re-synched.

Referring back to FIG. 3A, if the first verification value and the second verification value match or are within a predetermined range, the payment device is considered authentic (step 325), and an authorization request message indicating this is communicated to an issuer for approval of the transaction. In this example, the message is communicated to issuer A 120 because the account is associated with issuer A 120. In other embodiments, payment processing network 118 may approve of the transaction on behalf of issuer A 120. If approved, the counter value associated with the account identifier is stored for processing subsequent transactions (step 326).

If not authenticated at step 320, then the authentication is denied (step 330). Alternatively or additionally, if the server computer 126 determines that the payment device 102 being used is not authentic, then the server computer 126 may require further verification data from the consumer 100 or may forward this information to the issuer so that the issuer can determine if it wants to assume the risk of conducting the transaction. If the authentication is refused, a fraud alert may be set to indicate potential or actual fraud associated with the account as discussed earlier.

Figure 3B:
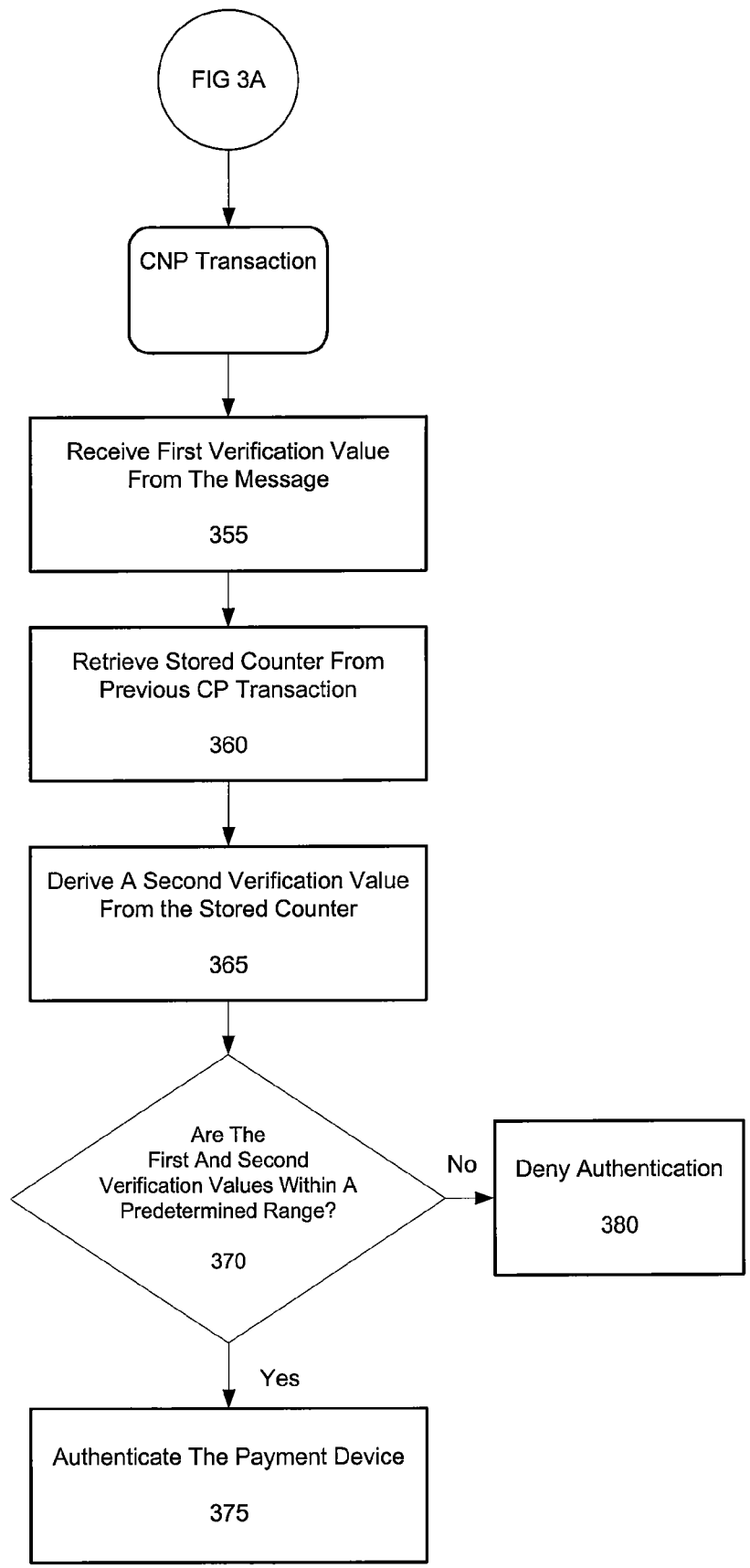
FIG. 3B shows a flow chart illustrating a process of authenticating a payment device in a card not present transaction using a counter-based verification value according to an embodiment of the invention.

Referring now to CNP transactions, FIG. 3B shows a flow chart illustrating a process of authenticating a payment device in a card not present transaction using a counter-based verification value according to an embodiment of the invention. The process can be described with reference to FIGS. 1, 2, and 3B. "Card not present" or "CNP" transactions can refer to any transactions that occur whereby a payment device (e.g., a phone, card, etc.) is not physically present at the merchant.

In an exemplary counter-based CNP transaction, a consumer 100 uses a payment device 102 to complete a transaction with a merchant 114. The payment device 102 does not interact with, for example, the merchant's access device 106, but may interact with the merchant 114 through the merchant's Website. The consumer 100 may use client computer 107 to communicate with the merchant's Website.

For example, in an Internet transaction, the consumer 100 will be prompted for an account identifier along with a verification value into the client computer 107. The consumer 100 may obtain these values in a plurality of ways.

For example, if the consumer is issued a payment device 102, the account identifier may be printed or displayed on the payment device 102. Furthermore, the verification value may also be printed or displayed on the payment device 102. If the payment device 102 is a card, the card may have a display showing the verification value as described in U.S. patent application Ser. No. 12/032,495. The display may comprise a bistable display, which can be in either of two stable states of optical transmission for a single value of the input light intensity. Accordingly, a bistable display will remain viewable even if the card is not powered.

In an embodiment, the displayed verification value does not change during CNP transactions that occur between CP transactions when using a counter-based verification value process. The verification value will change during each CP transaction.

After consumer 100 inputs the account identifier and the verification value, for example, via an interface in the computer 107, the values are then transmitted over the Internet to, for example, the Web site of the merchant 114. The access device 106 at the merchant 107 then inputs this information into a message record and sends the message to a payment processing network 118 for authentication. The payment processing network 118 receives the message (step 205).

The server computer 126 determines if the account identifier is valid, as explained above (step 208). After the account identifier is determined to be valid, the server computer 126 determines, as explained above, if there is dynamic verification associated with the account identifier (step 210). In this example, the server computer 126 determines that there is dynamic verification and that it is counter-based, so the server computer 126 selects the counter-based verification value process (step 230).

Next, the server computer 126 determines, in this example, that the transaction is a CNP transaction (step 310). The server computer 126 receives the first verification value from the authorization request message (step 355).

Then, the server computer retrieves a stored counter associated with a previous CP transaction from memory (step 360). In an embodiment, the stored counter value is associated with the last CP transaction, and all subsequent CNP transactions use a verification value derived from this counter value. The dynamic verification value changes when a payment device 102, such as a smartcard, is presented in a subsequent CP transaction, as explained above. Advantageously, this method accommodates payment devices that are not able to generate dynamic verification values independently of the payment processing network 118, while at the same time providing security.

After the stored counter value is retrieved from a memory in the server computer 126, the server computer 126 derives the second verification value by selecting a verification algorithm from a plurality of verification algorithms that is associated with the received account identifier (step 365). Verification algorithms include dCVV described in U.S. patent application Ser. No. 10/642,878, and dynamic magstripe card verification value (dmCVV) described in U.S. patent application Ser. Nos. 11/940,074, 60/884,089, and 60/866,105. Other algorithms may also be utilized. The server computer 126 determines the proper algorithm based on attributes associated with the account identifier that indicate the proper algorithm to use.

The server computer 126 then compares the first and second verification values (step 370). If the first verification value and the second verification value match or are within a predetermined range, the payment device 102 is authenticated by the payment processing network 118 (step 375). An authorization request message indicating this is communicated to an issuer for approval of the transaction. In this example, the message is communicated to issuer A 120 because the account is associated with issuer A 120. Otherwise, the authentication can be denied 380. Alternatively or additionally, the server computer 126 may determine that the payment device 102 being used is not authentic and may require further verification data from the consumer or may forward this information to the issuer so that the issuer can determine if it wants to assume the risk of conducting the transaction. If the transaction is refused, a fraud alert may be set as discussed above. Again, a predetermined range provides a means to accommodate possible errors causing the counter to be out of synchronization.

Figure 4:
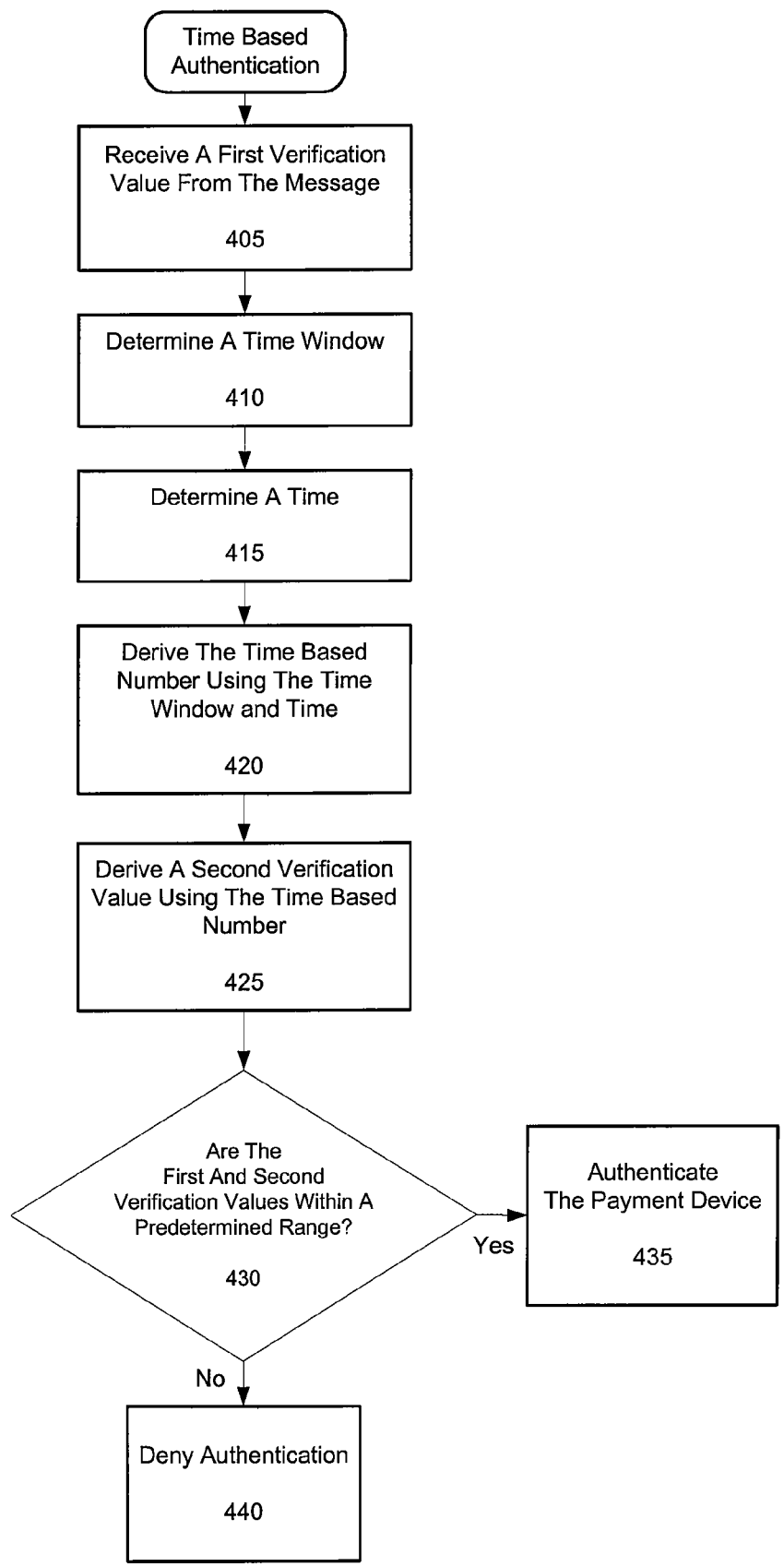
FIG. 4 shows a flow chart illustrating a process of authenticating a payment device using a time-based verification value according to an embodiment of the invention.

FIG. 4 shows a flow chart illustrating a method of authenticating a payment device using a time-based verification value. If the account identifier is associated with a verification value process wherein the first verification value is generated in response to a time-based trigger, then the server computer 126 selects time-based authentication process (step 235) and performs the steps in FIG. 4.

A time-based trigger may occur when, for example, a payment device 102 such as a phone with a payment application is used to complete a transaction. In an embodiment, a consumer 100 may select a payment application on the phone. The payment application then generates a dynamic verification value that is based on time. This verification value can then be used to complete the transaction. The process of authenticating this time-based verification value is described with reference to FIGS. 1, 2, and 4.

As discussed above, the authentication information comprises at least the account identifier and a dynamic verification value. In an embodiment using a time-based verification value, the first verification value is generated by the payment device 102 in response to a time-based trigger. A time-based trigger may be any application that uses time to determine a first verification value in response to a request. For example, an application on payment device 102 may determine the number of seconds from a predefined point to the present and generate the first verification value using that number.

After the time-based verification value process is selected by the server computer 126, the server computer 126 receives the first verification value in the authentication message (step 405). Then, a time window unit is determined by the server computer 126 (step 410). A time window unit expresses a predetermined range in which the first verification value is valid. The value may be expressed in a variety of units. For example, seconds, minutes, hours, days, weeks, months, years, or other units of time may be used to express the time window unit. In addition, any subdivision of these units may be used. As previously discussed, the predetermined range advantageously accounts for the possibility that the payment device and the payment processing network are not in synchronization.

Next, a unit of time is determined by the server computer 126 (step 415). The unit of time represents a value of time from a predetermined set point until the present. The value of this time may be measured in any unit of time as discussed above. For example, a unit of time may comprise the number of seconds since Jan. 1, 1970 until the present represented in coordinated universal time (UTC).

The server computer 126 then derives a time-based number (step 420) using the time window unit and the unit of time. In an embodiment, the unit of time is the numerator and the time window unit serves as the denominator. The result of this division is expressed as an integer by truncating the remainder. Furthermore, the result may be converted to a compressed numeric (CN) coded value of eight digits. If the result is less than eight digits, padding may be added to the most significant digits (left side of the number) in the form of zeros or any other suitable characters to reach eight digits.

The server computer 126 then derives a second verification value using the time-based number as part of the selected verification algorithm (step 425). In an embodiment, the selected algorithm may be the dCVV algorithm. The second verification value is then compared with the first verification value that was received (step 430). If the first verification value and the second verification value match or are within a predetermined range, then the payment device is authenticated (step 435). The predetermined range of values is based on input that can be used to determine the second verification value such as a time element or counter. For example, time element can be a date. If the first time element is today's date, a range of time elements may be yesterday's date through tomorrow's date. The predetermined range of values are determined based on yesterday's date through tomorrow's date.

In other embodiments, if the first verification value does not match the second verification value at step 435, the input is iteratively adjusted to determine another second verification value that may match the first verification value. If, for example, the second verification value is based on today's date, the time element may be adjusted to yesterday's date. A second verification value may be determined based on yesterday's date and compared to the first verification value. If the values do not match, the time element may be adjusted to tomorrow's date. A second verification value may be determined based on tomorrow's date and may be compared to the first verification value. In this way, the first verification value is compared to a range of values in an iterative way. In yet other embodiments, the payment device is authenticated at step 435 only if the first verification value and the second verification value match.

Once the payment device is authenticated, authentication is communicated to the issuer associated with the payment device 102 for processing of the transaction. An authorization request message indicating this is communicated to an issuer for approval of the transaction. In this example, the message is communicated to issuer A 120 because the account is associated with issuer A 120. If not authenticated, then the authentication is denied (step 440). Alternatively or additionally, if the server computer 126 determines that the payment device 102 being used is not authentic, then the server computer 126 may require further verification data from the consumer 100 or may forward this information to the issuer so that the issuer can determine if it wants to assume the risk of conducting the transaction. If the authentication is refused, a fraud alert may be set to indicate potential or actual fraud associated with the account as discussed earlier.

Figure 5:
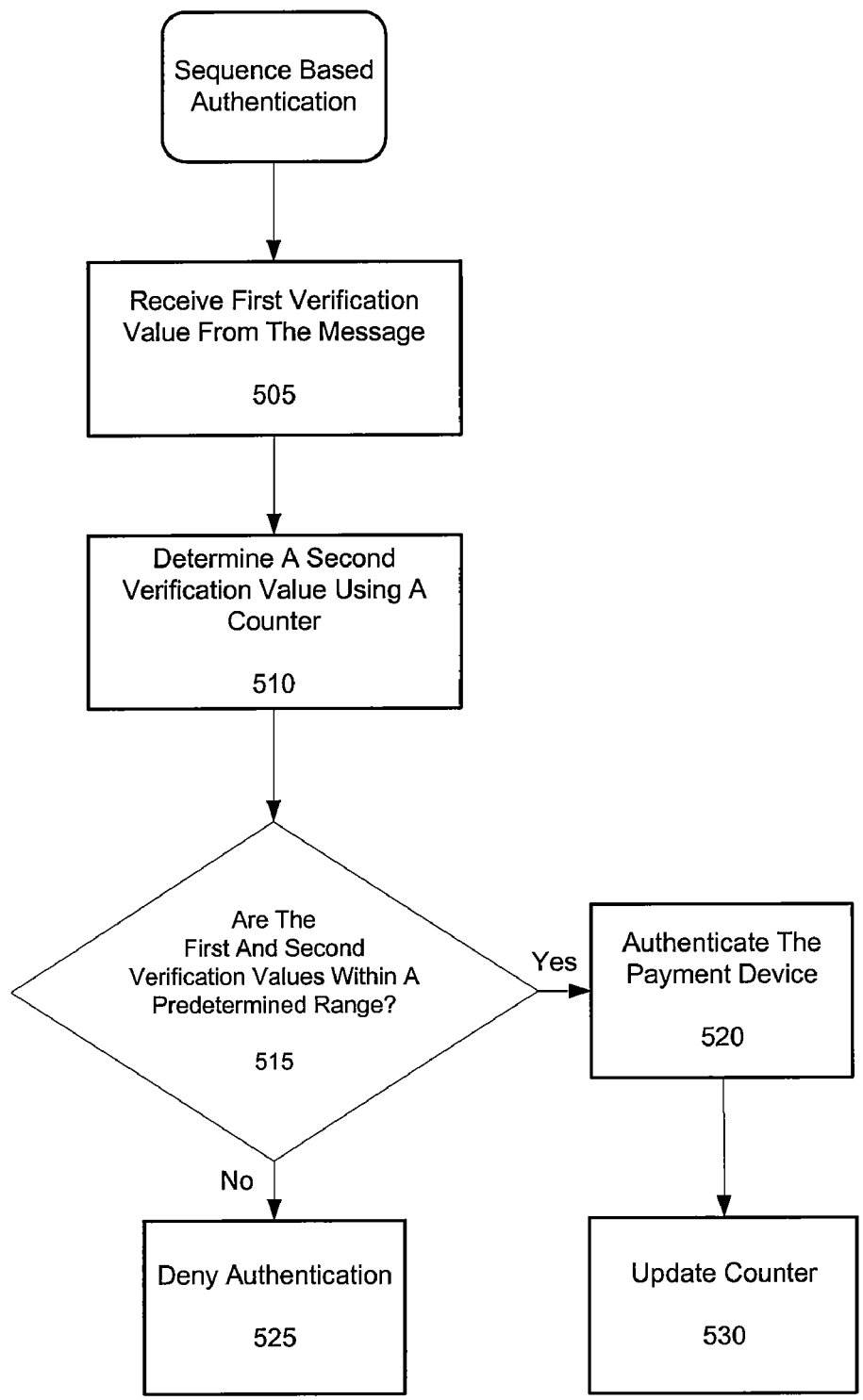
FIG. 5 shows a flow chart illustrating a process of authenticating a payment device using a sequence-based verification value according to an embodiment of the invention.

FIG. 5 shows a flow chart illustrating a method of authenticating a payment device using a sequence-based verification value according to an embodiment of the invention. A sequence-based verification value may be triggered when the first verification value is generated in response to consumer action without an access device. For example, an issuer 120 may provide a consumer 100 with a payment device 102 that when activated through consumer action produces a dynamic verification number. The dynamic verification number can then be used by the consumer 100 to complete a transaction.

In one embodiment, such a device might comprise a display that displays a dCVV number when the consumer pushes a button. Each time the button is pushed a new dCVV number is displayed. In order to maintain synchronization with a payment processing network, each dCVV number is based on a counter that changes by a known amount. For example, a first dCVV number may be derived by a first counter value of 101. A second dCVV number may be derived by a second counter value of 102, and so on. In this manner, the authentication system determines what the expected next dCVV is supposed to be. The counter may increment, decrement, or change values in some other predictable way. Examples of such devices are described in U.S. patent application Ser. Nos. 12/032,495 and 60/890,138, which are herein incorporated by reference in their entirety.

The process of authenticating a sequence-based verification value is described with reference to FIGS. 1, 2, and 5. As previously described with regard to an Internet transaction, a payment processing network 118 receives an account identifier and a first verification value from the consumer 100 in an authorization request message (step 205). The server computer 126 determines if the account identifier is valid (step 208). Then, the server computer 126 determines if dynamic verification is enabled (step 210). When sequence-based authentication is determined (step 225), then sequence-based verification value process is selected (step 240).

The server computer 126 retrieves a first verification value from the message (step 505). Then, the server computer 126 determines a second verification value using a counter value (step 510). As discussed above, each account identifier may be associated with a different algorithm for determining the verification value. For example, a dCVV or dmCVV algorithm may be used. Thus, the server computer 126 is further configured to select a verification algorithm from a plurality of verification algorithms, and determine the second verification value using the selected verification algorithm.

In an embodiment, the counter may be a stored counter that refers to the previous transaction. In another embodiment, the stored counter may be a pointer in a table that contains a pre-generated list of verification values, which obviates the need to derive a second verification value.

Next, the first verification value and the second verification value are compared by the server computer 126 (step 515). If the first verification value and the second verification value match or are within a predetermined range, then the payment device 102 can be authenticated, and the transaction can be subsequently authorized by the issuer (if there are sufficient funds and/or credit in the consumer's account) (step 420). Upon authentication, the counter can be updated by the server computer (step 530). If the first and second verification values are not within a predetermined range, then authentication is denied by the payment processing network 118 (step 525). Alternatively or additionally, the server computer 126 may determine that the payment device 102 being used is not authentic and may require further verification data from the consumer or may forward this information to the issuer so that the issuer can determine if it wants to assume the risk of conducting the transaction. Upon refusal, a fraud alert may be issued, as discussed above.

Sequence-based transactions may be used with numerous types of payment devices in addition to a payment device comprising a card with a button to generate verification values. For example, in an embodiment, the consumer 100 may be provided (by the issuer 120) a list of verification values that the consumer 100 accesses each time a verification value is requested by a merchant 114. For example, a spreadsheet file listing predetermined valid verification values may be used. In another example, a dedicated electronic device (as described above) may provide the verification value when requested. It will be appreciated that there are numerous other means to provide a predetermined list of verification values.

After the server computer 126 determines if the payment device 102 is authentic, the authentication information is communicated to the issuer associated with the payment device 102. An authorization request message indicating this is communicated to an issuer for approval of the transaction. In this example, the message is communicated to issuer A 120 because the account is associated with issuer A 120. If the payment device 102 is not authenticated, then the authentication is denied. Alternatively or additionally, if the server computer 126 determines that the payment device 102 being used is not authentic, then the server computer 126 may require further verification data from the consumer 100 or may forward this information to the issuer so that the issuer can determine if it wants to assume the risk of conducting the transaction. If the authentication is refused, a fraud alert may be set to indicate potential or actual fraud associated with the account as discussed earlier.

Figure 7A:
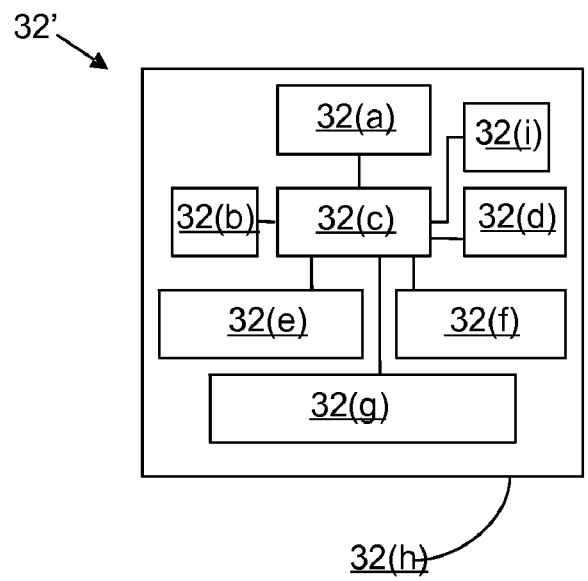
FIG. 7A shows a block diagram of a phone.
Figure 7B:
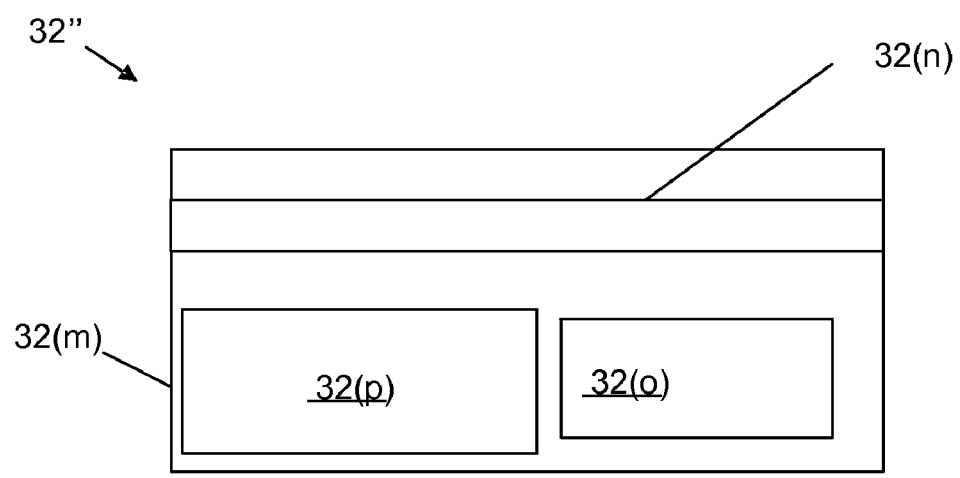
FIG. 7B shows an illustration of a payment card.

FIGS. 7(a)-7(b) show block diagrams of exemplary payment devices and subsystems that may be present in computer apparatuses in systems according to embodiments of the invention.

The payment device 102 (shown in FIG. 7A) may be in any suitable form. For example, suitable payment devices can be hand-held and compact so that they can fit into a consumer's wallet and/or pocket (e.g., pocket-sized). They may include smartcards, ordinary credit, debit or prepaid cards (with a magnetic strip and without a microprocessor), keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, software and the like. The payment devices can also be debit devices (e.g., a debit card), credit devices (e.g., a credit card), or stored value devices (e.g., a stored value card).

An exemplary payment device 32' in the form of a phone may comprise a computer readable medium and a body as shown in FIG. 7(a). (FIG. 7(a) shows a number of components, and the payment devices according to embodiments of the invention may comprise any suitable combination or subset of such components.) A computer readable medium 32(b) may be present within a body 32(h), or may be detachable from it. The body 32(h) may be in the form of a plastic substrate, housing, or other structure. The computer readable medium 32(b) may be a memory that stores data and may be in any suitable form including a magnetic strip, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the payment device 32'.

Information in the memory may also be in the form of data tracks that are traditionally associated with payment cards (e.g., credit cards). Such tracks include Track 1 and Track 2. Track 1 ("International Air Transport Association") stores more information than Track 2, and contains the cardholder's name as well as account identifier and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The payment device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) payment device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and the optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infrared, or other data transfer capability that can be used to exchange data between the payment device 32' and an interrogation device. Thus, the payment device 32' is capable of communicating and transferring data and/or control instructions via both cellular network and near field communications capability.

The payment device 32' may also include a processor 32(c) (e.g., a microprocessor) for processing the functions of the payment device 32' and a display 32(d) to allow a consumer to see phone numbers and other information and messages. The payment device 32' may further include input elements 32(e) to allow a consumer to input information into the device, a speaker 32(f) to allow the consumer to hear voice communication, music, etc., and a microphone 32(i) to allow the consumer to transmit the consumer's voice through the payment device 32'. The payment device 32' may also include an antenna 32(a) for wireless data transfer (e.g., data transmission).

If the payment device is in the form of a debit, credit, prepaid, or smartcard, the payment device may also optionally have features such as magnetic strips. Such devices can operate in either a contact or contactless mode.

An example of a payment device 32" in the form of a card is shown in FIG. 7(b). FIG. 7(b) shows a plastic substrate 32(m). A contactless element 32(o) for interfacing with an access device 34 may be present on or embedded within the plastic substrate 32(m). A consumer information region 32(p) may include information such as an account identifier, expiration date, and consumer name, which may be printed or embossed on the card. Further, a magnetic strip 32(n) may also be on the plastic substrate 32(m) and may be an example of a computer readable medium. In this embodiment, the payment device 32" may or may not have a processor. If it does not, then a corresponding access device may be used to form a dynamic verification value using information stored on the magnetic strip 32(n).

As shown in FIG. 7(b), the payment device 32" may include both a magnetic strip 32(n) and a contactless element 32(o). In other embodiments, both the magnetic strip 32(n) and the contactless element 32(o) may be in the payment device 32". In other embodiments, either the magnetic strip 32(n) or the contactless element 32(o) may be present in the payment device 32".

Figure 8:
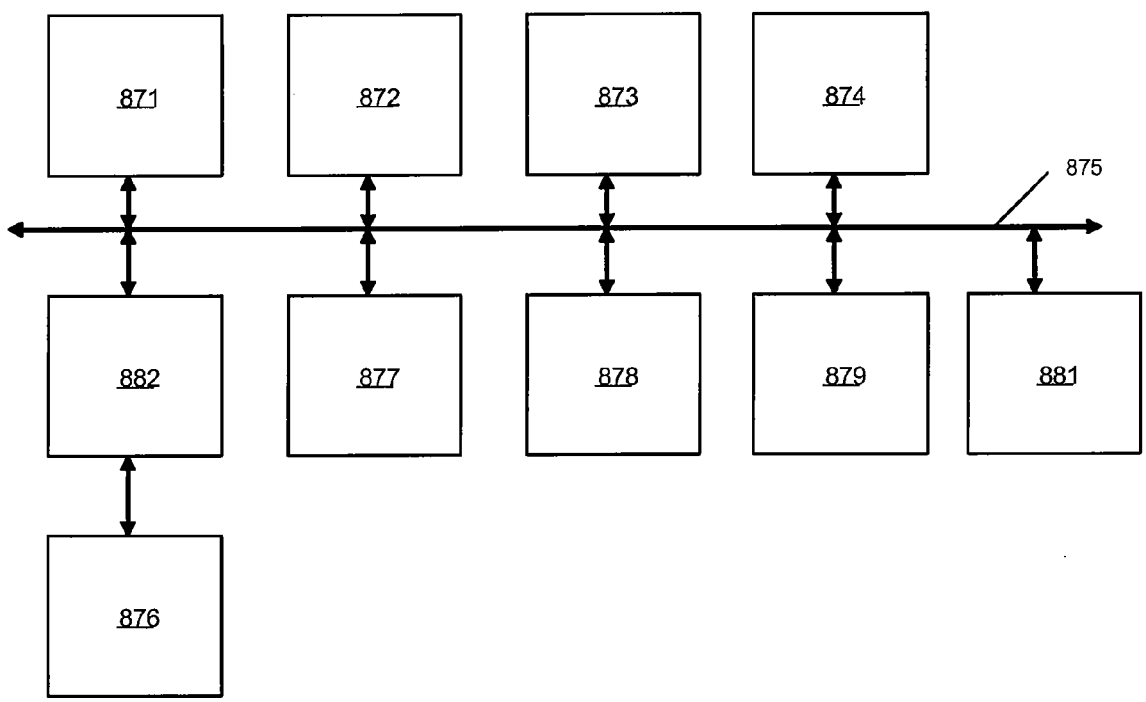
FIG. 8 shows a block diagram of a computer apparatus according to an embodiment of the invention.

The various participants and elements in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 8. The subsystems shown in FIG. 8 are interconnected via a system bus 875. Additional subsystems such as a printer 874, keyboard 878, fixed disk 879 (or other memory comprising computer readable media), monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer readable medium.

Any of the above described steps may be embodied as computer code on a computer readable medium. The computer readable medium may reside on one or more computational apparatuses and may use any suitable data storage technology.

Embodiments of the present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

Any of the software components or functions described in this application, may be implemented as software code to be executed by a processor using any suitable computer language such as, for example, Java, C++, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Use of the phrase 'the invention' or 'the present invention' is not meant to limit the claims in any manner and no conclusion should be drawn that any description or argument associated with a particular use of the phrase 'the invention' or 'the present invention' applies to each and every claim. The use of the phrase 'the invention' or 'the present invention' has been used solely for linguistic or grammatical convenience and not to effect a limitation of any nature on any of the claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an", or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    receiving a message including an account identifier and a first verification value;
    selecting, by a server computer, a dynamic verification value process from at least two dynamic verification value processes using the account identifier, wherein the at least two dynamic verification value processes are selected from a counter-based verification process, a time-based verification process, and a sequence-based verification process, wherein the counter-based verification process includes a verification value process specific for a card present type of transaction and a verification value process specific for a card not present type of transaction, and wherein the card not present type of transaction is a transaction that occurs where a payment device is not physically present at a merchant;
    determining, by the server computer, a second verification value using the selected dynamic verification value process; and
    determining if the first verification value and the second verification value match or are within a predetermined range.

2. The method of claim 1 wherein the payment device is a card.

3. The method of claim 1 wherein the payment device is authenticated if the first verification value and the second verification value match or are within a predetermined range.

4. The method of claim 3 wherein if the first verification value and second verification value do not match or are not in the predetermined range, a fraud alert is triggered.

5. The method of claim 4 wherein the fraud alert notifies an account holder, issuer, or merchant of potential fraudulent activity.

6. The method of claim 3 wherein if the first verification value and second verification value do not match or are not in the predetermined range, the account is blocked from further use.

7. The method of claim 1 wherein selecting the dynamic verification value process from the at least two dynamic verification value processes using the account identifier comprises selecting a verification algorithm from a plurality of verification algorithms.

8. The method of claim 1 wherein the message is an authorization request message.

9. The method of claim 8 wherein the authorization request message is generated in a transaction involving a payment device in the form of a phone.

10. The method of claim 9 wherein the phone has near field communications capability.

11. The method of claim 8 wherein the authorization request message is generated in a transaction involving a payment device in the form of a key fob.

12. The method of claim 1 wherein the second verification value is determined by retrieving a pre-determined verification value stored in a database.

13. A server computer comprising a micro-processor; and a non-transitory computer readable medium coupled to the micro-processor,
    the non-transitory computer readable medium comprising code, executable by the micro-processor for implementing a method comprising
    receiving a message, including an account identifier and a first verification value,
    selecting, by the server computer, a dynamic verification value process from at least two dynamic verification value processes using the account identifier, wherein the at least two dynamic verification value processes are selected from a counter-based verification process, a time-based verification process, and a sequence-based verification process, wherein the counter-based verification process includes a verification value process specific for a card present type of transaction and a verification value process specific for a card not present type of transaction, and wherein the card not present type of transaction is a transaction that occurs where a payment device is not physically present at a merchant;
    determining, by the server computer, a second verification value using the selected dynamic verification value process, and determining if the first verification value and the second verification value match or are within a predetermined range.

14. A method comprising:

generating, by an access device, a message including an account identifier and a first verification value; and sending the message to a server computer, wherein the server computer is configured to select a dynamic verification value process from at least two dynamic verification value processes using the account identifier, wherein the at least two dynamic verification value processes are selected from a counter-based verification process, a time-based verification process, and a sequence-based verification process, wherein the counter-based verification process includes a verification value process specific for a card present type of transaction and a verification value process specific for a card not present type of transaction, and wherein the card not present type of transaction is a transaction that occurs where a payment device is not physically present at a merchant, determine a second verification value using the selected dynamic verification value process, and determine if the first verification value and the second verification value match or are within a predetermined range.

15. The method of claim 14 wherein the payment device is a card.

16. The method of claim 14 wherein the payment device is authenticated if the first verification value and the second verification value match or are within the predetermined range.

17. The method of claim 14 wherein the server computer is further configured to select a verification algorithm from a plurality of verification algorithms.

18. An electronic device comprising: a micro-processor and a non-transitory computer readable medium coupled to the micro-processor, wherein the non-transitory computer readable medium comprises code executable by the micro-processor for implementing a method comprising generating, by the electronic device, a message including an account identifier and a first verification value, sending the message to a server computer, wherein the server computer is configured to select a dynamic verification value process from at least two dynamic verification value processes using the account identifier, wherein the at least two dynamic verification value processes are selected from a counter-based verification process, a time-based verification process, and a sequence-based verification process, wherein the counter-based verification process includes a verification value process specific for a card present type of transaction and a verification value process specific for a card not present type of transaction, and wherein the card not present type of transaction is a transaction that occurs where a payment device is not physically present at a merchant, and determining a second verification value using the selected dynamic verification value process, and determining if the first verification value and the second verification value match or are within a predetermined range.

19. The electronic device of claim 18 wherein the electronic device is in the form of a card.

20. The electronic device of claim 18 wherein the electronic device is an access device.

* * * * *